United States Patent
Klingebiel et al.

(10) Patent No.: US 7,610,895 B2
(45) Date of Patent: Nov. 3, 2009

(54) METHOD OF OPERATING AN INTERNAL COMBUSTION ENGINE IN AN ENGINE WARM-UP PHASE

(75) Inventors: Matthias Klingebiel, Waiblingen (DE); Roland Lütze, Leonberg (DE); Heiko Sass, Tamm (DE)

(73) Assignee: Daimler AG, Stuttgart (DE)

( * ) Notice: Subject to any disclaimer, the term of this patent is extended or adjusted under 35 U.S.C. 154(b) by 50 days.

(21) Appl. No.: 11/900,196

(22) Filed: Sep. 10, 2007

(65) Prior Publication Data

US 2008/0066724 A1    Mar. 20, 2008

Related U.S. Application Data

(63) Continuation-in-part of application No. PCT/EP2005/012612, filed on Nov. 25, 2005.

(30) Foreign Application Priority Data

Dec. 8, 2004    (DE) .................... 10 2004 059 004

(51) Int. Cl.
*F02B 3/00*    (2006.01)
(52) U.S. Cl. .................... 123/299; 123/568.12; 701/103
(58) Field of Classification Search .................. 701/103, 701/104, 108, 113; 123/295, 298, 299, 435, 123/445, 41.05, 41.1, 41.12, 41.14, 41.31, 123/41.44
See application file for complete search history.

(56) References Cited

U.S. PATENT DOCUMENTS

| | | | | |
|---|---|---|---|---|
| 5,740,775 A * | 4/1998 | Suzuki et al. | ............... | 123/299 |
| 6,213,086 B1 * | 4/2001 | Chmela et al. | ............... | 123/276 |
| 6,273,056 B1 * | 8/2001 | Shirakawa et al. | .......... | 123/305 |
| 6,412,469 B1 * | 7/2002 | Itoyama et al. | ............... | 123/299 |
| 6,789,512 B2 * | 9/2004 | Duvinage et al. | ......... | 123/41.05 |
| 6,799,558 B2 * | 10/2004 | Gmelin et al. | ............... | 123/431 |
| 6,823,832 B2 * | 11/2004 | Henning et al. | ............. | 123/299 |
| 7,128,026 B2 * | 10/2006 | Braun et al. | ............. | 123/41.01 |
| 2002/0020388 A1 * | 2/2002 | Wright et al. | ............... | 123/304 |

FOREIGN PATENT DOCUMENTS

| | | |
|---|---|---|
| DE | 101 55 339 | 5/2003 |
| EP | 0 889 220 | 1/1999 |
| EP | 1 281 852 | 2/2003 |
| EP | 1 424 481 | 6/2004 |

* cited by examiner

*Primary Examiner*—Stephen K. Cronin
*Assistant Examiner*—Johnny H. Hoang
(74) *Attorney, Agent, or Firm*—Klaus J. Bach

(57) ABSTRACT

In a method of operating an internal combustion engine of a motor vehicle during an engine warm-up phase, the engine having a cylinder including a piston defining in the cylinder a combustion chamber, wherein fuel is injected into the combustion chamber in a pilot injection, a main injection and, selectively, a post-injection, and during the heat-up phase of the engine, the center position of the combustion is retarded relative to a center position of the combustion in the normal engine operating mode in order to more rapidly heat the engine and the coolant in the engine cooling circuit for rapid heating of the passenger compartment of the motor vehicle.

13 Claims, 2 Drawing Sheets

METHOD OF OPERATING AN INTERNAL COMBUSTION ENGINE IN AN ENGINE WARM-UP PHASE

This is a continuation-in-part application of pending International Patent Application PCT/EP2005/012612 filed Nov. 25, 2005 and claiming the priority of German Patent Application 10 2004 056 004.4 filed Dec. 8, 2004.

BACKGROUND OF THE INVENTION

The invention relates to a method of operating an internal combustion engine during the engine heat-up phase depending on the engine coolant temperature, wherein the center of the combustion process is moved back to a retarded position.

In the operation of modern internal combustion engines, high efficiencies are obtained in combustion, in particular in auto-ignition internal combustion engines, so that less residual heat is present in the exhaust gas of the internal combustion engine than in internal combustion engines of lower efficiency. In modern internal combustion engines, therefore, more time passes until a cooling medium of a coolant circuit has warmed up to a temperature required for operating a heater. The generation or attainment of a specified temperature within the coolant circuit is necessary in order that sufficient heat for heating a passenger compartment can be dissipated from said coolant circuit by means of a heating heat exchanger.

Generally, local temperature peaks occur in the combustion chamber during the combustion. The coolant circuit serves to prevent a thermal overload of the materials used. The cooling medium or the coolant which is used circulates in an engine cooling system in order to dissipate the excess heat from the engine and to keep the engine at a temperature level for optimum efficiency. The coolant is conventionally composed of a mixture of a coolant concentrate and pre-treated water or drinking water. The amount of heat of an engine which is to be dissipated depends in particular on the combustion method and on the present load point. The cooling heat quantity which is to be dissipated with respect to the effective power is for example approximately one third in modern supercharged diesel engines with direct fuel injection in relation to a spark-ignition engine without supercharging. Said limited cooling heat quantity leads to a poor heating capability in particular during a warm-up phase of the internal combustion engine after a cold start at low ambient temperatures. Accordingly, heating comfort in the passenger compartment of a vehicle can only be expected in a suitable reasonably short time by means of an additional measure, for example in the form of an auxiliary heater. Compensation of the lack of heating heat can otherwise not be obtained.

In order to avoid the need for an auxiliary heater for cost, space and weight reasons, engine-internal measures are proposed for providing suitable heating comfort. The movement of the center of the combustion is a known measure with which it is possible to raise the coolant temperature by a less efficient combustion. The center position of the combustion is, on the basis of the first law of thermodynamics, that point in time during the combustion at which approximately 50% of the fuel quantity introduced into the combustion chamber has been converted. The position of the center of combustion is conventionally denoted by the associated crank angle position, that is to say a crank angle position of the piston, at which 50% of the fuel quantity involved in the combustion has been converted to heat. The center position of the combustion is likewise known as the 50% mass conversion point.

DE 101 55 339 A1 discloses a method in which an internal combustion engine is operated in such a way that, in order to reach or maintain a desired coolant temperature, a heating mode can be initiated. In such a mode, operating parameters of the internal combustion engine are set so as to meet required nominal power values for a maximum possible heat input into the coolant and/or into the exhaust gas. Here, in the heating mode, a center position of the combustion is moved in the late direction relative to a center position of the combustion in the normal mode.

Since modern engines are increasingly operated with multiple injection in order to meet future exhaust gas standards and in order to reduce the fuel consumption, it is the principal object of the present invention to provide a method for operating an internal combustion engine in which an intensified heat transfer into a coolant circuit of the internal combustion engine is obtained by means of engine operating measures.

SUMMARY OF THE INVENTION

In a method of operating an internal combustion engine with a cylinder including a piston defining in the cylinder a combustion chamber, in particular a diesel internal combustion engine, with multiple direct fuel injections, the engine having a coolant circuit and an exhaust gas recirculation device, the fuel is injected into the combustion chamber in a pilot injection, a main injection and selectively a post-injection, while the internal combustion engine is operated in a heat-up phase as a function of the engine coolant temperature. During the heat-up phase, the center position of the combustion is retarded relative to a center position of the combustion in the normal engine operating mode, and in order to increase the heat transfer to the coolant circuit, the pilot injection is carried out in the form of at least two partial quantities, with the injection of the entire fuel quantity taking place in such a way that the center position of the combustion during the heat-up phase is after top dead center.

The introduction of the pilot injection in a plurality of partial quantities, preferably in two partial quantities, leads to an increase of the charge temperature in the combustion chamber, so that a higher combustion temperature can be generated in a subsequent main injection. This increases an effective introduction of heat into a cooling medium of the coolant circuit. Considerably faster heating of the combustion chamber wall is achieved by means of an obtained higher combustion temperature. The presence of the desired combustion temperature within a suitable time is obtained in the context of the invention as a function of the number of partial quantities of the pilot injection. According to the invention, therefore, during the heat-up phase, a release of heat of the fuel injected into the combustion chamber takes place in a targeted manner in terms of time. The switch to the heat-up phase leads to an at least 40% increase in heat being transferred to the coolant circuit. The coolant can be quickly heated in this way. This leads to rapid and adequate heating of the passenger compartment without the need for an additional heater. A fuel post-injection is preferably carried out in an idle speed range. This ensures stable operation of the internal combustion engine during the heat-up phase.

Preferably, during the heat-up phase, the partial quantities of the pilot injection are introduced into the combustion chamber in a range from 30° CA before top dead center to 5° CA after top dead center, preferably in a range from 25° CA to 5° CA before top dead center. The timing according to the invention of the pilot injections generates a targeted increase of the combustion temperature and therefore an intensified heat transfer through the combustion chamber wall to the coolant. With regard to an introduction of heat into the coolant circuit, as is advantageously aimed at within the context of the invention, it is possible to provide for an optimum time of the heat release of the fuel proportions of the pilot injection.

During the heat-up phase, the main injection may be carried out in a range from 5° CA to 40° CA, preferably between 15° CA and 25° CA or between 10° CA and 30° CA after top dead center. By carrying out the main injection in the proposed range, a high combustion temperature and a maximum release of heat from the fuel injected into the combustion chamber are obtained at a time, at which rapid heating of the combustion chamber wall is desired. An effective and increased heat transfer to the coolant circuit takes place in this way. In particular in a part-load range after a cold start, it is possible by means of the measures according to the invention to quickly establish a required coolant temperature in order to ensure comfortable heating at extremely low ambient temperatures.

In a further embodiment of the invention, the injection of the entire fuel quantity takes place in such a way that the center position of the combustion during the heat-up phase is situated after the top dead center. This measure aims at ensuring a favorable combustion center position, for the release of heat from the entire fuel quantity injected into the combustion chamber.

In a further embodiment of the invention, during the heat-up phase, the center of combustion is situated in a range from 20° CA to 60° CA, preferably in a range from 25° CA to 50° CA after top dead center. The starts of the ignitions of the pilot and main injections obtained by means of the injection strategy according to the invention, the favorable heat release profile obtained by means of the division of the pilot-injected fuel proportions, and the center of the combustion which is set in a targeted fashion so as to generate an adequate and optimum heat output in relation to a normal operating mode of the internal combustion engine.

The effects obtained by the engine-internal measures by means of the injection strategy according to the invention are attributed predominantly to a favorable trade-off between the division of the pilot injection into a plurality of partial quantities, and the hereby optimized time available for the release of heat and the obtained center position of the combustion. The intensified heat introduction into the coolant is further optimized during the heat-up phase depending on the injection times of the pilot and main injections, in particular in the part-load range. A sufficient heating effect can accordingly be realized rapidly in particular after a cold start. The use of an additional heater is therefore not necessary.

In a particular embodiment of the invention, during the heat-up phase, a first partial quantity of the pilot injection is selected so as to be greater than a subsequent partial quantity of the pilot injection. This provides for an optimum release of heat to the engine coolant.

In a further embodiment of the invention, during the heat-up phase, a first partial quantity of the pilot injection is selected so as to be smaller than a subsequent partial quantity of the pilot injection. This likewise causes a high heat release.

In still a further embodiment of the invention, a ratio of a pilot injection fuel quantity to a main injection fuel quantity during the heat-up phase is greater than a ratio of a pilot injection fuel quantity to a main injection fuel quantity during a normal engine operating mode. This provides for an advantageous time for the release of heat, whereby the introduction of heat into the coolant circuit is optimized. It is possible here, by means of the set ratio of pilot injection to main injection, to adhere to combustion chamber temperature limits with regard to material stresses.

In another embodiment of the invention, the main injection quantity during the heat-up phase is set to be smaller than the main injection quantity in the normal operating mode. This permits the generation of a relatively large amount of heat in particular at low ambient temperatures.

In a further embodiment of the invention, an exhaust gas quantity re-circulated into the combustion chamber by means of the exhaust gas recirculation device during the heat-up phase is greater than a re-circulated exhaust gas quantity in the normal operating mode. In this way, during the heat-up phase, the exhaust gas temperature is increased in relation to that in the normal operating mode. With a higher exhaust gas recirculation rate, it is possible to provide for the generation and transfer of additional heat into the coolant circuit, since the coolant circuit generally extends through an EGR cooler. The re-circulated exhaust gases nevertheless have a higher temperature after the extraction of heat within the EGR cooler than the intake combustion air, and the temperature of the combustion air is therefore increased. Accordingly, an increased amount of heat is generated in a short time in particular after a cold start of the internal combustion engine.

The invention will become more readily apparent from the following description of exemplary embodiments of the invention with reference to the accompanying drawings:

DESCRIPTION OF EXEMPLARY EMBODIMENTS

Figure 1:
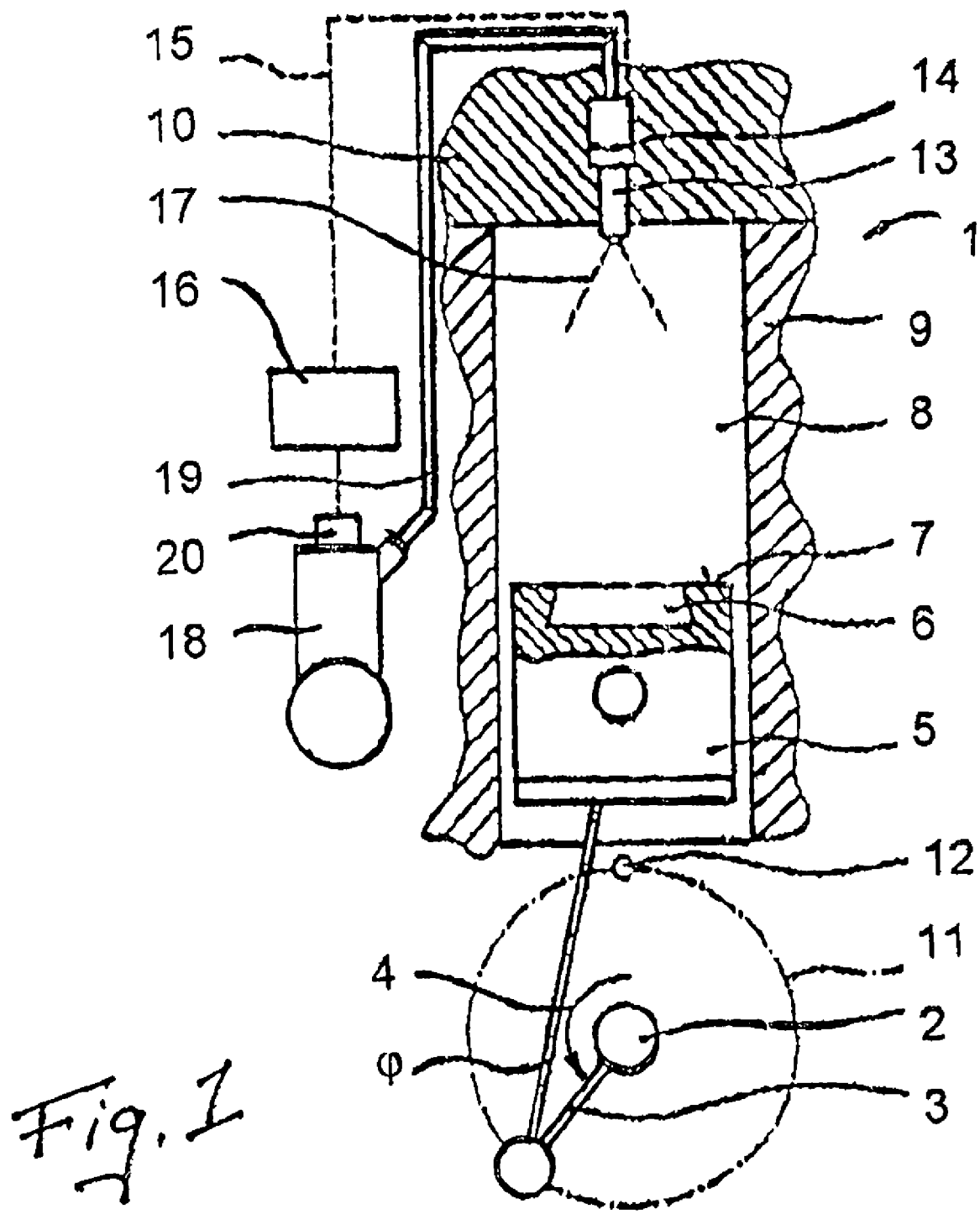
FIG. 1 is a schematic cross-sectional view of a diesel internal combustion engine and FIG. 2 shows schematically a comparison between pressure and combustion profiles of a heating mode and normal operating mode of the diesel internal combustion engine of FIG. 1.

FIG. 1 shows an internal combustion engine 1 in which a crankshaft 2 is driven via a connecting rod 4 by a piston 5 which is guided in a cylinder 9. Formed in the cylinder 9 between the piston 5 and a cylinder head 10 is a combustion chamber 8 which preferably comprises a recess 6 which is formed in the piston base 7. The piston rod 4 is connected to a crank 3 of the crankshaft 2 which, as it rotates clockwise on a crank circle 11, the combustion chamber 8 is reduced in size, with the air enclosed therein being compressed. The charge exchange in the combustion chamber 8 takes place by means of gas exchange valves (not illustrated) and gas ducts (not illustrated) in the cylinder head 10. When the crank 3 reaches a top dead center 12, also referred to as TDC, the end of the compression is reached, at which point the combustion chamber 8 has the smallest volume and the highest compression pressure and also the highest compression temperature. The momentary position of the piston 5 in relation to the cylinder head 10 is determined by a crank angle $\phi$ relative to top dead center 12.

A fuel injection device comprises an injection nozzle 13, an injection pump 18, a shutoff valve 20 and an actuator 14. The injection nozzle 13, which is preferably a multi-hole nozzle, is arranged centrally in the cylinder head 10. The injection nozzle 13 is controlled via a signal line 15 and the actuator 14, for example a hydraulic or piezoelectric actuator, by an electronic control unit 16 of an engine controller. The fuel jets emerging from the injection nozzle 13 are denoted by the numeral 17. The fuel is provided by the injection pump 18. The shutoff valve 20 is expediently an electronically actuable solenoid valve, limiting the respective maximum pressure in the fuel line 19.

The internal combustion engine 1 also comprises a coolant circuit (not illustrated) in which a coolant circulates and which, at various points within the internal combustion engine 1, either has heat imparted to it or has heat extracted from it. Conventionally, a heating heat exchanger serves to transfer heat from the coolant to the air which heats a passenger compartment of a vehicle on demand. In order to ensure sufficient heating power, a specified coolant temperature is needed. Only then is sufficient heat present in the coolant circuit in order to quickly heat up a passenger compartment. The introduction of heat into the coolant takes place in particular as the coolant circulates in the region of the combustion chamber 8, when local peak temperatures occur there during combustion. The coolant circuit serves to prevent a thermal overload of the combustion chamber wall both in the region of the cylinder 9 and also within the cylinder head 10. The excess heat in the combustion chamber 8 is dependent on the momentary engine load.

If, at low ambient temperatures, the internal combustion engine 1 runs in a normal operating mode with a high efficiency, in particular in the case of auto-ignition internal combustion engines, an transfer of heat into the coolant for example in the part-load range of the internal combustion engine 1 cannot lead to a rapid heating of the coolant. In order to avoid unfavorable heating conditions, the fuel injection strategy according to the invention provides for a switch from a normal operating mode of the internal combustion engine 1 to a heat-up mode. The switch takes place in particular at low ambient temperatures and is preferably carried out as a function of the coolant temperature.

The heat-up operating mode has the aim of quickly increasing the coolant temperature. An intensified introduction of heat into the coolant is necessary for this purpose. The invention therefore provides an altered fuel injection strategy during the heat-up phase. Said altered fuel injection strategy comprises a clocked pilot injection VE, a main injection HE and if appropriate a post-injection. The pilot injection VE is preferably realized by means of a separate injection of two individual partial fuel quantities. The amount of the partial quantities is preferably carried out in such a way that the first partial quantity is greater than the second partial quantity.

In an advantageous embodiment of the invention, the partial quantities of the pilot injection VE are injected into the combustion chamber in a range from 30° CA before top dead center 12 to 5° CA after top dead center 12. The main injection HE takes place thereafter preferably in a range from 5° CA to 40° CA after TDC. According to the invention, in order to obtain a high combustion temperature and in order to provide for an increased transfer of heat into the coolant, the introduction of the entire fuel quantity into the combustion chamber 8 is carried out in such a way that the center position of the combustion during the heat-up phase is situated in a range from 20° CA to 60° CA, preferably in a range from 25° CA to 50° CA after top dead center 12. In order to avoid irregular running of the internal combustion engine in an idle speed range or in a lower speed and load range, the post-injection is carried out during the heat-up phase.

An advantageous heat-up mode is obtained by establishing during the heat-up phase a ratio of pilot injection quantity VE to main injection quantity HE which is greater than a ratio of pilot injection quantity VE to main injection quantity HE in the normal operating mode. The main injection quantity HE during the heat-up mode is set to be smaller than the main injection quantity HE in the normal operating mode.

Figure 2:
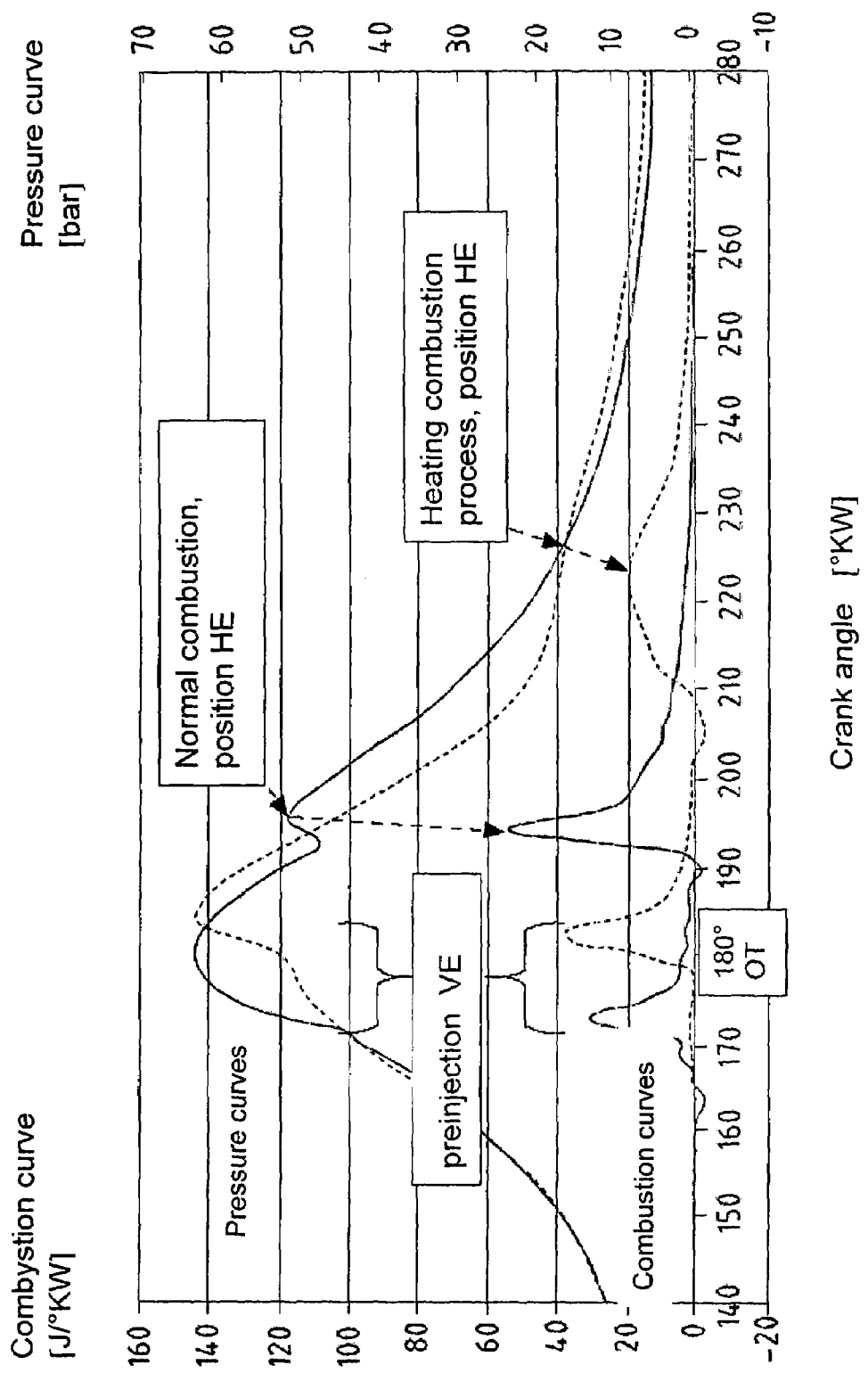

In the injection strategy illustrated in FIG. 2, first, a clocked pilot injection VE takes place in the compression stroke of the internal combustion engine 1 in a crank angle range from 25° CA to approximately 5° CA before TDC. The clocked pilot injection VE takes place in such a way that, in the subsequent main injection HE, a later release of heat takes place in accordance with the invention. As a result of the targeted clocking of the pilot injection VE and as a result of the injection times according to the invention of the partial quantity of the pilot injection VE, a high combustion chamber temperature is obtained in comparison with a normal operating mode of the internal combustion engine 1, providing for a combustion chamber temperature profile resulting in a high heat release during the subsequent main injection HE for the maximum transfer of heat into the coolant. The difference with respect to the normal operating mode is illustrated in FIG. 2. In the normal operating mode, the internal combustion engine is operated with an optimum efficiency. In that case, a combustion profile, which is aimed at the most efficient conversion of the heat into a mechanical force, is generated. For most efficient operation, the maximum release of heat should take place just after top dead center 12 at a point at which the piston 5 moves away from top dead center. In the normal operating mode, as per FIG. 2, the maximum release of heat takes place in a range from 10° CA to 20° CA after top dead center 12 resulting in a steep rise of the combustion profile (position HE).

In contrast, during the heat-up phase as per FIG. 2, a steep rise of the combustion profile is avoided, so that a high gas charge temperature is generated. The hot combustion gases hereby formed in the combustion chamber 8 cause rapid heating of the combustion chamber wall resulting in an increased transfer of heat to the coolant. Furthermore, during the heat-up phase, the exhaust gas is discharged from the combustion chamber 8 at a higher temperature, so that, in addition, heat is also transferred to the coolant in a heat exchanger (not illustrated) of an exhaust gas recirculation device.

According to the present exemplary embodiment, when a specified coolant temperature is reached, the system is switched back to the normal mode. A switch to the normal operating mode is likewise carried out if a torque demand above a torque limit value is present. If, upon reduction of the torque demand again below the limit value, a desired coolant temperature has not yet been reached, then the system can be switched back to the heat-up phase. A switch-over to the normal operating mode is likewise carried out if a dynamic mode is present, for example in the form of the continued setting of different main injection quantities.

The effects obtained by the engine-internal measures by means of the injection strategy according to the invention are to be attributed predominantly to a favorable trade-off between the division of the pilot injection VE into a plurality of partial quantities, and the hereby optimized time for the transfer of heat to the coolant or the obtained center position of the combustion. A further increase in the introduction of heat into the coolant is obtained during the heat-up phase by the exhaust gas recirculation rates which are set to be higher. A superposition of the two effects leads to the generation of a sufficient heat in particular after a cold start in a part-load engine operating range. The need for an additional heater is thereby circumvented.

The present invention is suitable both for spark-ignition and for auto-ignition internal combustion engines.

What is claimed is:

1. A method of operating an internal combustion engine during engine warm-up, said engine including a cylinder with a piston defining a combustion chamber and a fuel injection device for a direct injection of fuel into the combustion chamber, and further a coolant circuit and an exhaust gas recirculation device for re-circulating exhaust gas to the combustion chamber, said method comprising the steps of:
   injecting fuel into the combustion chamber of the internal combustion engine in a pilot injection, main injection and, selectively, a post-injection, operating the internal combustion engine in a heat-up phase as a function of a coolant temperature of the engine, wherein a center position of the combustion is moved in a heating mode in a late direction relative to a center position of the combustion in a normal engine operating mode, and in order to increase a generation and transfer of heat to the coolant during the heat-up phase, the fuel is injected during the pilot injection in the form of at least two distinct partial quantities.

2. The method as claimed in claim 1, wherein, during the heat-up phase, the partial quantities of the pilot injection are injected into the combustion chamber in a range from 30° CA before top dead center to 5° CA after top dead center position of the piston.

3. The method as claimed in claim 2, wherein the fuel is injected in a range of from 25° CA to 5° CA before the top dead center position of the piston.

4. The method as claimed in claim 1, wherein, during the heat-up phase, the main fuel quantity is injected in a range of from 5° CA ATDC to 40° CA ATDC.

5. The method as claimed in claim 4, wherein the main fuel quantity is injected in the range of between 15° CA and 25° CA after top dead center.

6. The method as claimed in claim 1, wherein the injection of the entire fuel quantity takes place in such a way that the center position of the combustion during the heat-up phase is situated after top dead center.

7. The method as claimed in claim 1, wherein, during the heat-up phase, the center of the combustion is situated in a range from 20° CA to 60° CA, after top dead center.

8. The method as claimed in claim 7, wherein the center of combustion is situated in a range from 25° CA to 50° CA after top dead center.

9. The method as claimed in claim 1, wherein, during the heat-up phase, a first partial quantity of the pilot injection is selected to be greater than a subsequent partial quantity of the pilot injection.

10. The method as claimed in claim 1, wherein, during the heat-up phase, a first partial quantity of the pilot injection is selected to be smaller than a subsequent partial quantity of the pilot injection.

11. The method as claimed in claim 1, wherein a ratio of pilot fuel injection quantity to main injection quantity during the heat-up phase is greater than a ratio of the pilot fuel injection quantity to main fuel injection quantity in the normal engine operating mode.

12. The method as claimed in claim 1, wherein the main fuel injection quantity during the heat-up phase is selected to be smaller than the main fuel injection quantity in the normal engine operating mode.

13. The method as claimed in claim 1, wherein an exhaust gas quantity which is re-circulated into the combustion chamber by means of the exhaust gas recirculation device during the heat-up phase is selected to be greater than a re-circulated exhaust gas quantity in the normal engine operating mode.

* * * * *